United States Patent [19]

Lieser

[11] 4,141,278
[45] Feb. 27, 1979

[54] POLYGONAL TURNING MACHINE

[75] Inventor: Karl Lieser, Wuppertal, Fed. Rep. of Germany

[73] Assignee: Hermann Werner, Wuppertal

[21] Appl. No.: 704,117

[22] Filed: Jul. 8, 1976

[30] Foreign Application Priority Data

Nov. 27, 1975 [DE] Fed. Rep. of Germany ....... 2553216

[51] Int. Cl.² .......................... B23C 1/00; B23C 3/13
[52] U.S. Cl. .................................................. 90/11 R
[58] Field of Search ........................................ 90/11 R

[56] References Cited

FOREIGN PATENT DOCUMENTS 249643 8/1926 Italy .......................................... 90/11 R Primary Examiner—Othell M. Simpson
Attorney, Agent, or Firm—Martin A. Farber

[57] ABSTRACT

A polygonal turning machine with a rotating knife head, and a workpiece carrier rotating synchronously to the knife head, the carrier being arranged on a support, characterized in that, the axis of the workpiece carrier is able to be brought into a coaxial position to the axis of rotation of the knife head.

9 Claims, 9 Drawing Figures

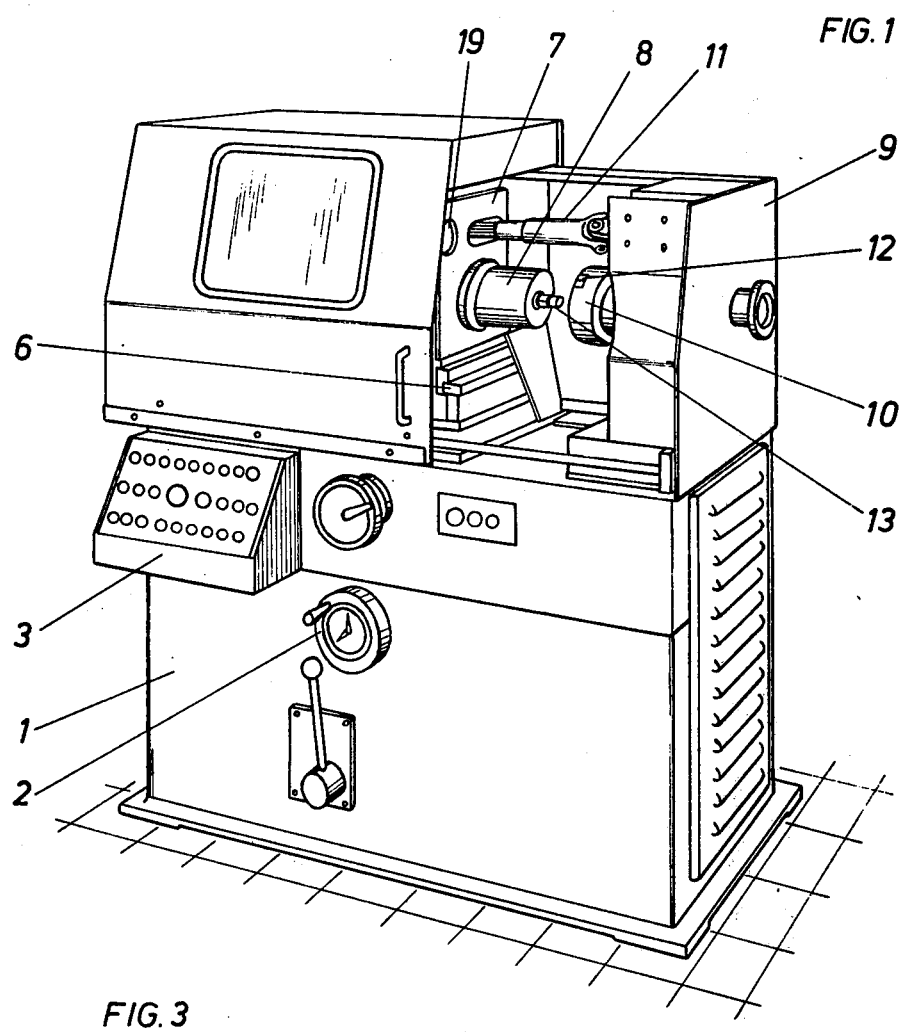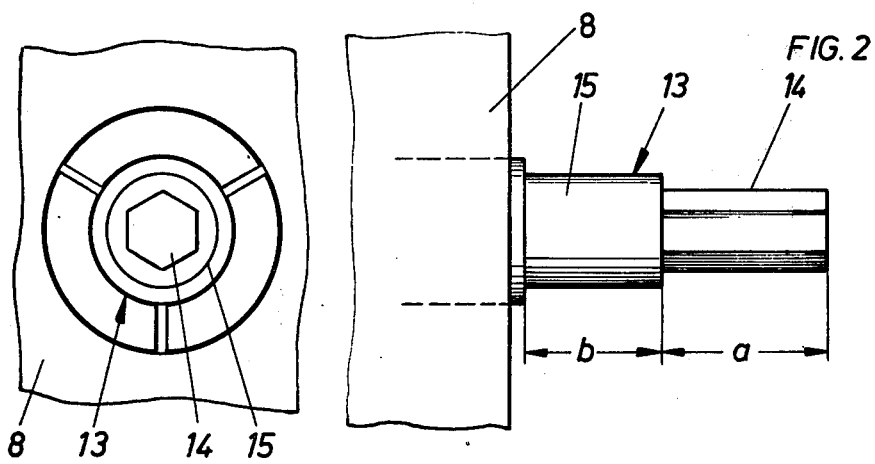

POLYGONAL TURNING MACHINE

The present invention relates to a polygonal turning machine with rotating knife head, and a workpiece carrier rotating synchronously to the knife head, the carrier being arranged on a support.

Polygonal or multi-edge shaped workpieces may be made advantageously on such polygonal, or multi-edge, turning machines or lathes. If the workpieces are to be provided yet with cross-sectionally round sections, it is necessary to undertake the round or cylindrical turning before the multi-edge (polygonal) working, or to do so thereafter on normal turning machines or lathes. However the fact is disadvantageous that two machines must remain available for such a workpiece. The machine expense is therefore larger. Still another is that resetting and reloading times are required for the workpieces, which further increase the manufacturing costs. Likewise, by the resetting and reloading, manufacturing inaccuracies can occur so that the resetting and reloading must be carried out with greater care.

It is an object of the present invention, particularly, that is in addition to that which may be gathered from the specification and the claims, to construct a polygonal turning machine according to the introductory-mentioned type, in a simple technical production manner, of such type that without resetting and reloading of the workpiece, a polygonal working as well as a cylindrically plain turning can be carried out on the workpiece.

In accordance with this object, according to the present invention, the axis of the workpiece carrier (herein called the workpiece carrier-axis) can be brought into a coaxial position to the rotational axis of the knife head (herein the knife head-rotation axis).

According to such a constructional formation, an introductory-type polygonal turning machine is provided of increased utility. Now with one, and the same, polygonal turning machine there can be provided multi-edge (polygonal) working on a workpiece as well as cylindrical turning, without resetting or reloading the workpiece. As a consequence, the operative range of such a polygonal turning machine is considerably increased; this means that its efficiency is greater. Further the otherwise required resetting and reloading of the workpiece is made unnecessary and is avoided. Manufacturing inaccuracies which arise as a result of the resetting, accordingly no longer occur. Higher manufacturing precisions thereby are permitted to be realized during short manufacturing times. It is possible to undertake the cylindrical turning first on the workpiece, and thereafter, to carry out the polygon working, or also first to carry out the polygonal working and then the cylindrical turning. If for example first the polygonal working is carried out, for the subsequent cylindrical turning thus only the workpiece carrier and the workpiece carrier - axis, respectively, is to be brought into the coaxial position to the knife head-rotation axis. This occurs simply by support movement, which for example is able to be stopped by suitable feed limit stops such as electro-end switches or the like. The additional production expense is consequently small, with the advantages achieved thereby, however being considerable.

An advantageous feature according to the present invention resides in that, the knife head carrying the outer cutters for the polygonal turning has a cavity which is coaxially disposed to its axis of rotation. Additional cutters for the cylindrical turning project into this cavity.

With the use of such a knife head one can carry out with the same, the polygonal working as well as cylindrical turning, so that changing or exchange of the knife head is avoided. This brings about likewise the advantage of a reduction of the manufacturing times.

The present invention is proven advantageous further in that, the additional cutters for the cylindrical turning are associated with planes which are disposed one behind the other in the axial direction. In one single longitudinal pulling movement, thus also a large turning or cutting chip removal can occur. Preferably the cutter lying closer to the workpiece carrier-axis carries out the finishing working or turning.

The operative range of the polygonal turning machine is increased according to the present invention, in the manner that the synchronous drive is converted from running in the same direction to counter running or anti-rotation. The same direction running proves particularly advantageous for obtaining of a larger cutting capacity, that is for the rough working. The counter running is selected for the fine-finishing machining.

Still further it is yet advantageous according to the present invention, that the workpiece support has a bore therein for the alternative choice of insertion of a counter holder-sleeve, or of a tool holder. The bore opens in a direction toward the side of the workpiece carrier and is oriented axially parallel to the workpiece carrier-axis. During machining of relatively longer workpieces, vibrations are prevented by the use of the counter holder-sleeve. The same bore however can also receive the tool holder. The latter is particularly suited for light turning operations, radial recessing, edge breaks, cleaning thereof and burr removal operations.

With the above and other objects and advantages in view, the present invention will beome more clearly understood from the following detailed description of preferred embodiments, in connection with the accompanying drawings, of which:

FIG. 1 is a perspective illustration of a polygonal turning machine in accordance with the present invention;

FIG. 2 is a side elevational view of a workpiece disposed in the workpiece carrier worked by the polygonal turning machine;

FIG. 3 is a flipped front side view from the right of FIG. 2;

Figure 4:
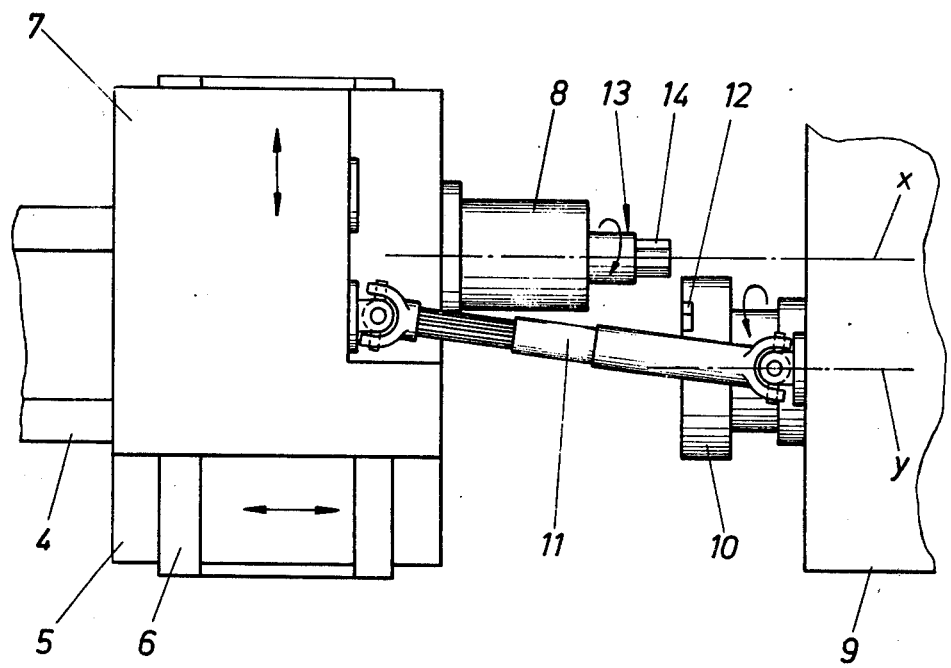
FIG. 4 is a schematic plan view of the workpiece carrier and knife head in axially parallel arrangement for the polygon turning.

Referring now to the drawings, a polygonal or multi-edge turning machine or lathe in accordance with the present invention comprises a leg stand 1 in which the drive (not shown) is housed. By means of a hand wheel 2, the rotational speed gears or transmissions can be varied. A control panel 3 is located on the leg stand 1, the control panel 3 having the corresponding monitoring switches and control indicators thereon.

At the top of the leg stand 1, the latter is provided with a guide 4, on which a carriage 5 slides. The carriage 5 is equipped with a cross guide 6 for a slide rest 7 (herein called the support 7). The carriage 5 and the support 7 can be displaced in the directions of the arrows respectively indicated in FIG. 4.

The support 7 contains a drive (not illustrated), which moves and translates the workpiece carrier 8 into rotational movement, the carrier 8 being constructed as a clamping chuck for holding the workpiece 13, as may be noted from FIG. 3.

The stock or standard 9 extends from the leg stand 1 in counter position to the support 7. This standard 9 receives the knife head 10. The synchronous drive between the workpiece carrier 8 and the knife head 10 takes place by means of a telescopic cardan shaft 11, which connects the drive contained in the support 7 with the drive gears for the knife head, the latter-mentioned drive gears being housed in the standard 9.

FIG. 4 shows an axially parallel position of the workpiece carrier axis x and the knife head-rotation axis y. This position is selected if the polygon 14 is supposed to be produced on the workpiece 13, by means of the outer cutters or cutting edges 12 of the knife head 10. In addition to this, the support 7 is displaced such that the outer cutters 12 are adjusted to the corresponding immersion or penetration depth, after which a longitudinal pulling movement of the support 7 takes place in the direction of the knife head 10. In this manner, for example, the polygon 14 is produced of the length a.

Figure 5:
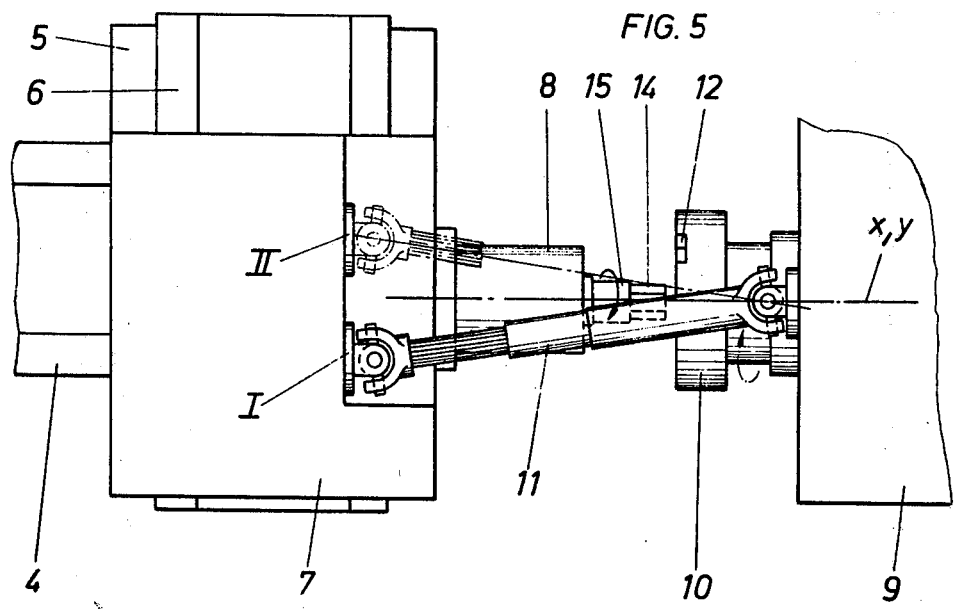
FIG. 5 is a view corresponding to FIG. 4, however with the workpiece carrier-axis and the knife head-rotation axis brought in coaxial position for the cylindrical or longitudinal turning.

In order now to be able to manufacture a band section 15 on the same workpiece 13, the workpiece carrier-axis x is brought into the coaxial position relative to the axis of rotation y of the knife head 10 by means of a displacement of the support 7, comparing FIG. 5. As a consequence of the telescopic cardan shaft 11, this can be undertaken and provided without trouble or disturbance. The cylindrical turning now takes place by means of the additional cutters 16, 16' of the knife head 10 (noting FIGS. 6 and 7). These cutters 16, 16' project into the central cavity 17 of the knife head 10, the cavity 17 being coaxial to the axis of rotation. The cavity 17 is larger than the diameter of the workpiece to be worked.

Figure 7:
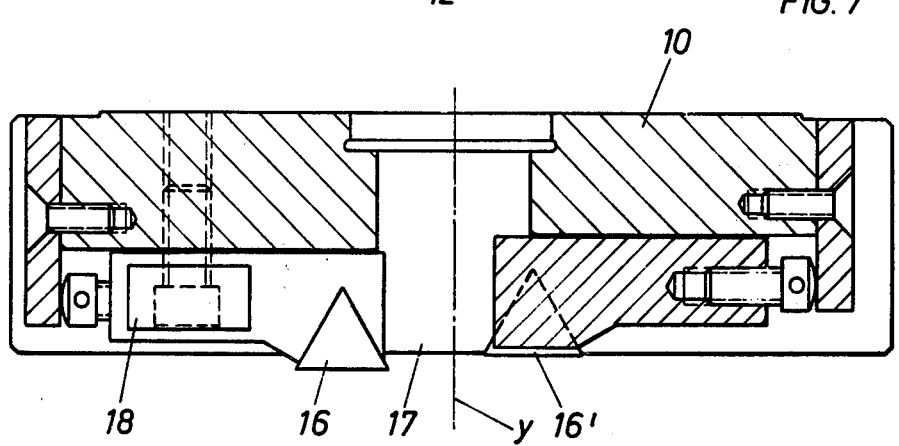
FIG. 7 is a cross-sectional view through the knife head of FIG. 6.

As may be evidently seen from FIG. 7, the additional cutters 16 and 16' for the cylindrical turning are arranged on planes, which planes are disposed in the axial direction spaced one behind the other, such that the cutter 16 which points to the workpiece 13 is removed spaced further from the rotation axis y than that of the other cutter 16'. The cutter 16 thus handles the preliminary or rough machining working and the other cutter 16' takes care of the subsequent working or machining. In only a single longitudinal pulling movement, from this, a large turning or chip removal can occur with simultaneous fine machining.

Figure 6:
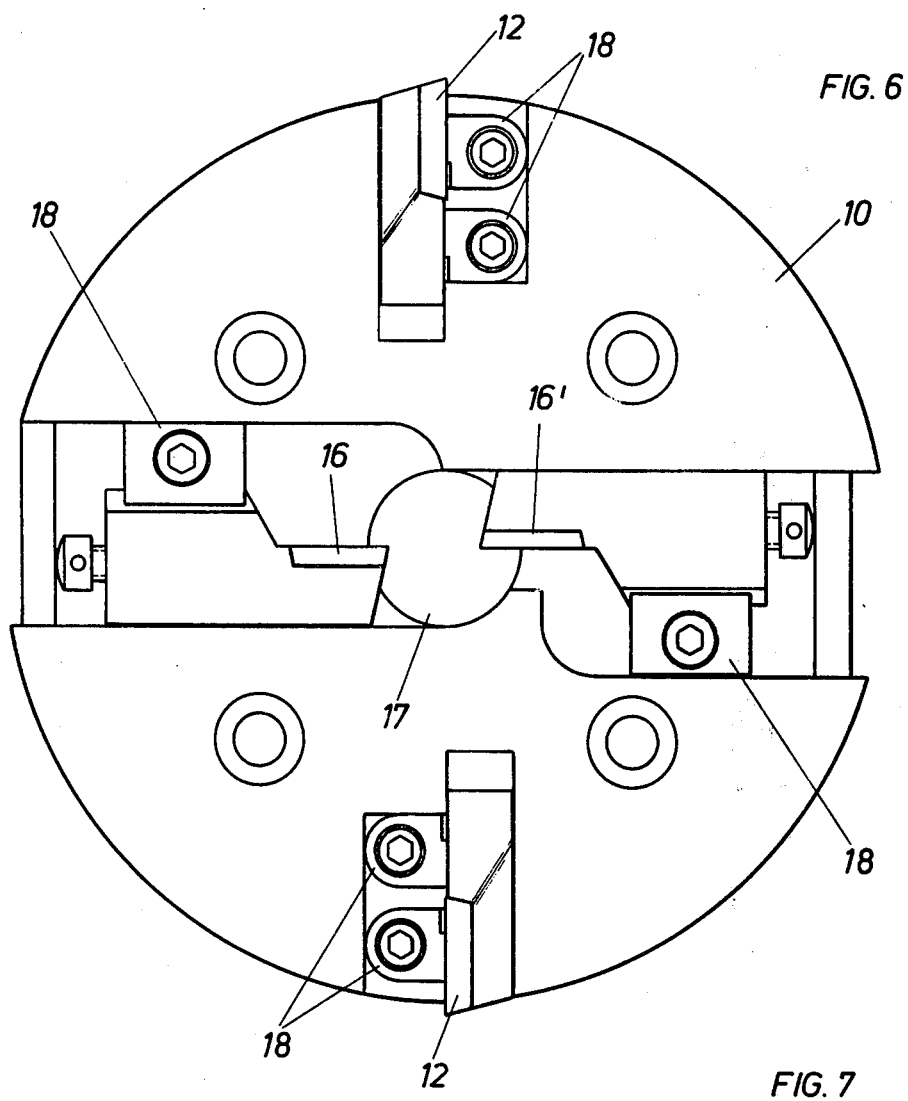
FIG. 6 is a front view toward the knife head which is suited both for the polygonal working and for the cylindrical turning.

As evident from FIGS. 6 and 7, the outer cutters 12 and the inner disposed cutters 16, 16' can be adjusted as a consequence of clamping jaws 18. After untightening or release of the clamping jaws 18 by untightening the screws (shown in FIG. 6 with a hexagon for a complementary tool and also shown in FIG. 7 in vertically dashed lines), a displacement of the cutters can be undertaken by the laterally illustrated screws in FIGS. 6 and 7.

In order to obtain a synchronous operation or running in the same direction, from the anti-rotation or counter running (illustrated in FIGS. 4 and 5) of the workpiece carrier 8 and the knife head 10, the telescopic cardan shaft 11 can be brought into the dot-dashed line position illustrated in FIG. 5. For this purpose the cardan shaft 11 is displaced from the power take-off position I to the power take-off position II. In this manner, various different machining or working ratios and relationships can be realized on the polygonal turning machine of the present invention.

Figure 8:
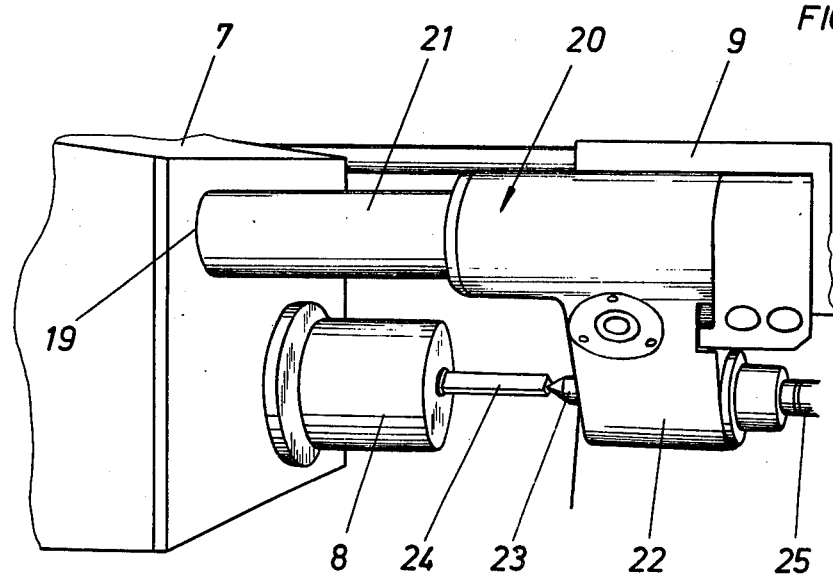
FIG. 8 is a perspective view of a counter holder-sleeve positioned in application on the workpiece support.
Figure 9:
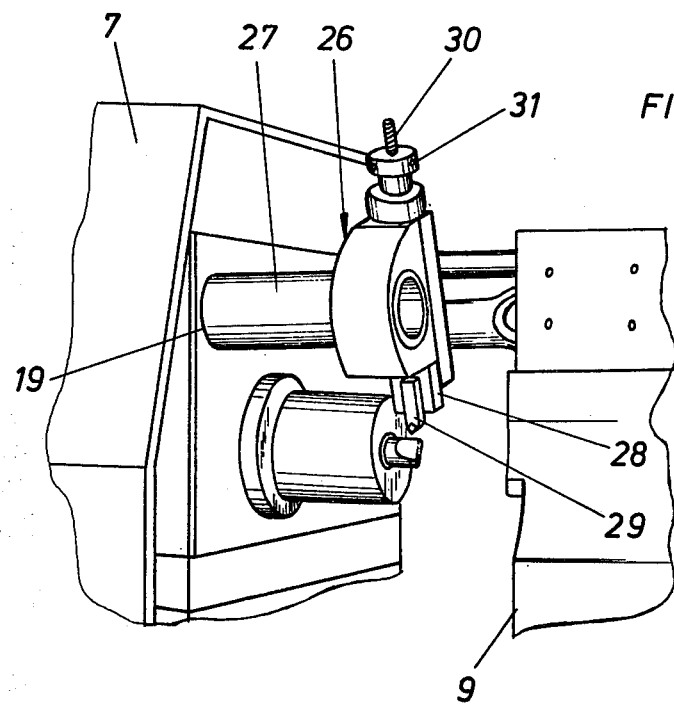
FIG. 9 is a perspective view of a tool holder for certain turning operations inserted in the bore of the workpiece support.

The workpiece support 7 as may be seen from FIGS. 1, 8 and 9, is formed with a bore 19 with a round or other cross-section, which bore 19 opens toward the side of the workpiece carrier 8 and is axially parallel to the workpiece carrier axis x. According to FIG. 8, the bore 19 receives the counter holder-sleeve 20. The latter possesses a stay bar 21 which projects into the bore 19, and which carries on its end side the counter holder 22. The sleeve 23 which is accommodated in the counter holder 22 brings about a supporting of the workpiece 24. The sleeve 23 is displaceable by means of a stroke or hydraulic cylinder 25 in and out of the working position. For this the supporting sleeve member 23 is displaceably mounted in the counter holder 22. The counter holder 22 in addition can be swung away about its axis away from the plane of working, examplewise for loading or charging purposes.

The bore 19 can also serve for mounting of the tool holder 26, as may be seen in FIG. 9. The tool holder 26 is seated on the end of a tubular shaped rod 27, which rod 27 is pushed into the bore 19. The tool holder 26 itself is equipped with a toolholder or slide 28 for receiving and mounting the cutter 29 thereon. A shifting or adjustment of the toolholder 28 can be provided by means of a screw spindle 30 and an adjustment nut 31 operatively arranged thereon. In this manner likewise, a round or cylindrical turning can be undertaken; these are particularly easy light turning operations as radial recessing or grooving, edge type breaks or scrap cleaning and burr-removal processing.

While I have disclosed embodiments of the present invention, it is to be understood that these embodiments are given by example only and not in a limiting sense.

I claim:

1. A combination polygonal and cylindrical turning machine, comprising
   a rotatable knife head defining an axis of rotation,
   cutter means for a polygonal turning mounted on said knife head,
   additional cutter means for a cylindrical turning mounted on said knife head,
   a support,
   a workpiece carrier adapted to hold a workpiece and rotatably mounted on said support, said workpiece carrier defining a workpiece carrier-axis,
   means for rotating said workpiece carrier synchronously to said knife head,
   guide means for selectively bringing said workpiece carrier-axis from a non-coaxial position into a coaxial position to said axis of rotation of said knife head such that said cutter means and said additional cutter means operatively project onto the workpiece held by said workpiece carrier, respectively, to perform thereon a polygonal turning and a cylindrical turning, respectively, in each of said positions.

2. The combination polygonal and cylindrical turning machine, as set forth in claim 1, wherein
said knife head is formed with a cavity, the latter being coaxial to said axis of rotation of said knife head,
said cutter means for a polygonal turning, is mounted on said knife head adjacent an outer surface of the latter,
said additional cutter means for a cylindrical turning, is mounted on said knife head, project into said cavity.

3. The combination polygonal and cylindrical turning machine, as set forth in claim 2, wherein
said additional cutter means for the cylindrical turning include cutters which are arranged in planes lying one behind the other in the axial direction of said knife head.

4. The combination polygonal and cylindrical turning machine, as set forth in claim 1, wherein
said rotating means constitutes synchronous drive means for selectively driving said workpiece carrier and said knife head in an operatively same rotatable direction, as well as in an operatively counter rotatable direction, respectively,
means for changing said drive means from said driving of said workpiece carrier and said knife head in said operatively same rotatable direction to said driving in said operatively counter rotatable direction.

5. The combination polygonal and cylindrical turning machine, as set forth in claim 4, wherein
said rotating means includes a telescopic cardan shaft.

6. The combination polygonal and cylindrical turning machine, as set forth in claim 1, wherein
said guide means includes cross guide means for selectively displacing said support to and from said coaxial position and an axially parallel position, respectively, of said workpiece carrier-axis and said axis of rotation of said knife head.

7. The combined polygonal and cylindrical turning machine, as set forth in claim 6, further comprising
axially aligned guide means for displacing said support in the axial direction of said workpiece carrier.

8. The combination polygonal and cylindrical turning machine, as set forth in claim 1, wherein
said support is formed with a bore means for selective insertion therein of a tool holder,
said bore means opens in a direction toward a side of said workpiece carrier,
said bore means defines an axis aligned parallel to said workpiece carrier-axis.

9. The combination polygonal and cylindrical turning machine, as set forth in claim 8, further comprising
a tool holder includes a rod, the latter removeably insertable in said bore means,
said tool holder includes a toolholder means for mounting a cutter thereon,
means for displacing said toolholder means in a lateral direction with respect to said workpiece carrier-axis.

* * * * *